United States Patent [19]

Hosmer et al.

[11] 3,884,259
[45] May 20, 1975

[54] THREE-WAY VALVE FOR CONTROLLING THE FLOW OF FLUIDS AT CRYOGENIC TEMPERATURE AND AT WIDELY DIFFERENT PRESSURES

[75] Inventors: Thomas P. Hosmer, Concord; Robert W. Johnson, Holbrook, both of Mass.

[73] Assignee: Cryogenic Technology Inc., Waltham, Mass.

[22] Filed: Jan. 21, 1974

[21] Appl. No.: 434,984

[52] U.S. Cl. ............ 137/375; 137/637.2; 251/248
[51] Int. Cl. .......................... F16k 1/04; F16k 11/20
[58] Field of Search ........ 137/375, 608, 637, 637.2, 137/637.3

[56] References Cited
UNITED STATES PATENTS

| 3,195,564 | 7/1965 | Carney et al. | 137/375 |
| 3,438,220 | 4/1969 | Collins | 23/285 |

FOREIGN PATENTS OR APPLICATIONS

| 14,530 | 6/1897 | United Kingdom | 137/637.2 |

Primary Examiner—Martin P. Schwadron
Assistant Examiner—Richard Gerard
Attorney, Agent, or Firm—Bessie A. Lepper

[57] ABSTRACT

A three-way valve suitable for controlling the flow of a cryogenic fluid and of isolating zones of widely different pressures. Concentric valve stems, each terminating in a sealing means capable of making a fluid-tight, line seal between a high-pressure zone and an evacuated zone, are moved to alternately open ports to attain fluid communication with a third port. Means are provided to eliminate pressure differentials across the valve stem screw drive means to eliminate gas forces which would otherwise be present in a valve operating between zones of different pressures. The three-way valve is particularly suitable in high-pressure clean up systems incorporating cold charcoal traps in alternating parallel fluid flow paths.

17 Claims, 9 Drawing Figures

THREE-WAY VALVE FOR CONTROLLING THE FLOW OF FLUIDS AT CRYOGENIC TEMPERATURE AND AT WIDELY DIFFERENT PRESSURES

This invention relates to a three-way valve for controlling fluid flow and more particularly to a three-way valve capable of controlling the flow of cryogenic fluids between zones which vary widely in fluid pressures.

In many closed-circulation cryogenic devices and particularly in cryogenic refrigerators and liquefiers using helium as the fluid, it is necessary to continuously remove impurities from the circulating fluid. Systems for accomplishing this impurity removal normally include a pair of cooled charcoal traps arranged in parallel relationship such that when one trap is being used to adsorb impurities from a high-pressure fluid stream, the other trap is being evacuated to remove the adsorbed impurities and, in effect, to regenerate the trap. Valving means must be provided in such a system so that, for example, helium at about 250 p.s.i. can continuously flow through the system while a 500-micron vacuum is alternately maintained first in one of the traps and then in the other. The design of such a valving system is further complicated by the fact that it must function efficiently at temperatures as low as 10°K while being operable by hand or by a suitable automatically controlled mechanism which is external of the cryogenic environment and which is normally at ambient temperatures.

Another example of the use of such a cryogenic valving system which must be capable of handling widely different fluid pressures is in the control of high-pressure fluid into and expanded low-pressure cold fluid from an expansion engine, such as for example the expansion engine described in U.S. Pat. No. 3,438,220. Such a three-way cryogenic valve may also be usable to advantage in LNG systems.

In the presently used cryogenic fluid clean-up systems incorporating charcoal traps in parallel it is customary to use two valves for each high-pressure line, one valve controlling fluid flow into one trap and the other valve controlling fluid flow into the other trap. Since each valve must have means extending into the ambient atmosphere for actuating it, each valve provides a heat-leak path from the cold zone of the system. In some refrigeration and/or liquefaction systems, space for such auxiliary equipment as valves and their actuating mechanism is very limited and it would be highly desirable to combine the functions of two valves into one if possible to conserve space as well as to reduce the number of heat leak paths. Three-way valves for handling other than cryogenic fluids are known, but they are unsuitable for efficient operation at cryogenic temperatures as well as for those applications where vacuum and high-pressure lines and particularly where lines which alternate between vacuum and high-pressure are connected. It is apparent that it would be desirable to have a three-way valve suitable for controlling the flow of cryogenic fluids in various systems.

It is therefore a primary object of this invention to provide a three-way valve particularly suitable for handling cryogenic fluids and controlling their flow between zones which vary widely in fluid pressures. It is another object to provide such a three-way valve which is readily operable in spite of such pressure diferentials, which minimizes heat leaks into the cryogenic system in which it is incorporated and which can effectively seal off zones which are alternately at very high and very low pressure. Still another object of this invention is to provide a three-way valve particularly suited for controlling the flow of fluid through parallel charcoal traps used in cryogenic fluid clean-up systems. Other objects of the invention will in part be obvious and will in part be apparent hereinafter.

The three-way valve of this invention has a valve block which is at a cryogenic temperature and a screw drive mechanism at ambient temperature connected to the block through elongated valve stems. The valve block and a major part of the stems are maintained under insulating conditions during use, and the stems, which are coaxial, are preferably formed as thin-walled tubings containing insulating material. The valve body defines two chambers of different diameters connected through a first frustoconically-configured shoulder which provides a sealing surface for an outer seal. First and second ports, one into each chamber, are adapted to connect the valve to two different zones, the pressures in each of which may vary between high-pressure and a vacuum; and a third port into the smaller-diameter chamber is adapted to connect the valve to a constant-pressure zone. The second port into the smaller-diameter chamber defines with that chamber a second frustoconically-configured shoulder which provides a sealing surface for an inner seal. The seals are configured to make line contact with their respective sealing surfaces and also to make line sealing contact with the valve stem plugs to which they are affixed. A fluid-tight annular passage is defined between the inner and outer stems and it is in continuous fluid communication with the constant-pressure fluid entering through the third valve port. Axial motion is imparted to the stems through separate screw drives, the screws of which are housed in a fluid-tight chamber which is in fluid communication through a fluid passage with the larger-diameter valve body chamber so that the gas pressure across the screws is always equalized, thus eliminating unwanted gas forces acting against the turning of the screws.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which FIG. 1 is a diagram of a cryogenic fluid clean-up system using parallel charcoal traps and incorporating two three-way valves of this invention;

Since the use of helium represents the most difficult gas to handle in terms of operational temperatures and degree of impurity removal, the three-way valve of this invention will be described in terms of controlling the flow of this cryogenic fluid. It is, however, to be understood that the valve of this invention can be used for controlling fluid flow of other cryogens.

Figure 1:
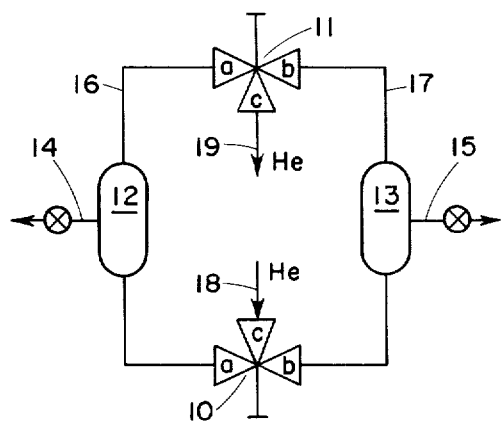

FIG. 1 illustrates diagrammatically the use of two three-way cryogenic valves 10 and 11, constructed in accordance with this invention, in a helium clean-up system using cold charcoal traps 12 and 13 in parallel. These traps are normally maintained at liquid nitrogen temperature or lower by means not shown and are connected through valve-controlled lines 14 and 15 to evacuating means not shown. High-pressure helium to be purified is caused to flow alternately through flow path 16 incorporating charcoal trap 12 and flow path 17 incorporating charcoal trap 13. When helium is flowing in path 16, the valve in line 14 is closed, ports $a$ of valves 10 and 11 are open to the flow of high-pressure helium and ports $b$ of valves 10 and 11 are exposed to vacuum conditions since the valve of line 15 is open to the evacuating means for removal of the adsorbed impurities from charcoal trap 13. When the time comes in the clean-up cycle to switch traps, valves 10 and 11 are actuated to close ports $a$ and open ports $b$. Simultaneously, of course, the valve in line 15 is closed and the valve in line 14 is opened to the evacuating means thus reversing the situation so that ports $b$ are open to the flow high-pressure helium and ports $a$ are closed and exposed to vacuum conditions. Ports $c$ remains open throughout and are always connected to the high-pressure helium flow path represented by lines 18 and 19. It will be appreciated that FIG. 1 represents but one exemplary use for the three-way valve of this invention.

Figure 2:
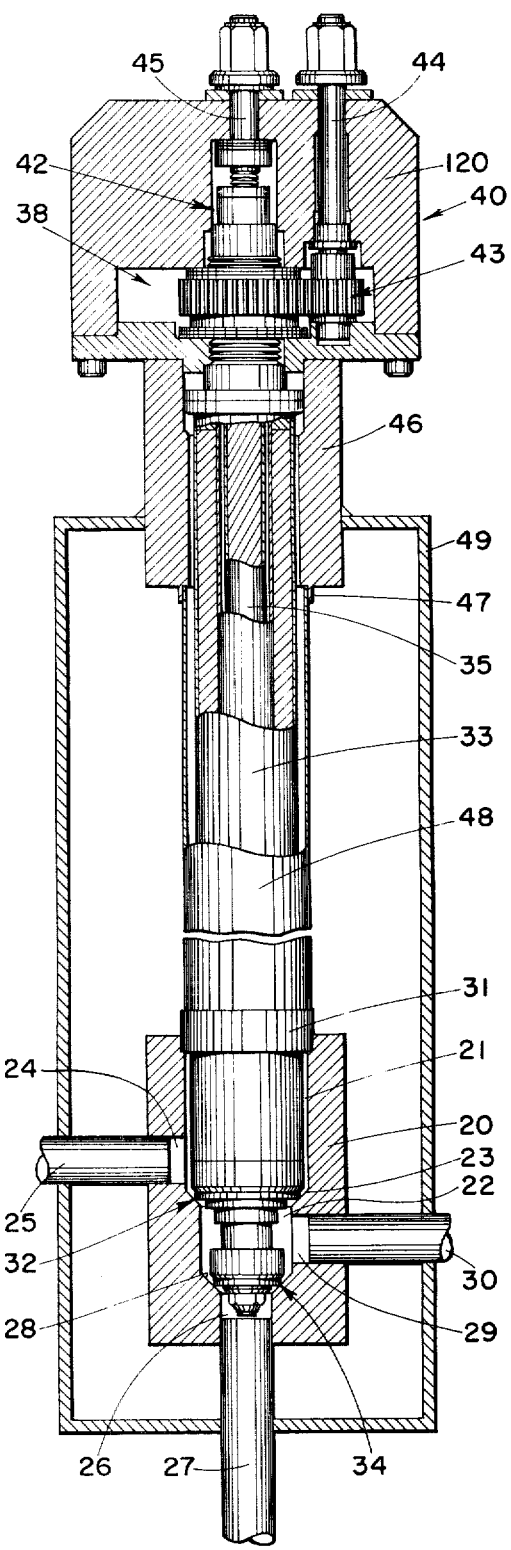
FIG. 2 is a longitudinal view, partly in cross section, of the three way valve of this invention.
Figure 9:
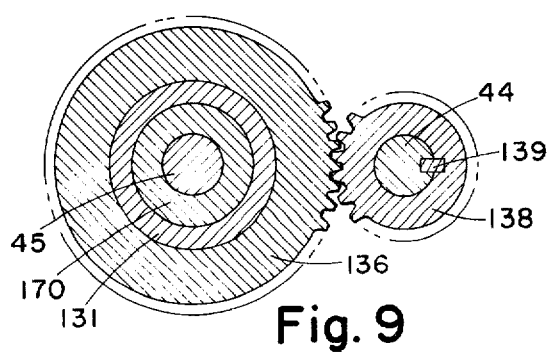
FIG. 9 is a cross section through the gear drive used in moving the outer stem taken through plane 9—9 of FIG. 8.

The three-way cryogenic valve of this invention is shown, partly in cross section, in FIG. 2. It is comprised of a valve block 20 defining a first chamber 21 and a second chamber 22 of a smaller diameter than chamber 21 and joined to it through a frustoconically-configured shoulder 23 which serves as a first sealing surface. A first fluid port 24 provides fluid communication into chamber 21 through a suitable conduit 25 (e.g., line 16 of FIG. 1) which can alternate between being either a high-pressure of low-pressure fluid line. A second fluid port 26 provides fluid communication into chamber 22 through a suitable conduit 27 (e.g., line 17 of FIG. 1) which can likewise alternate between being either a high-pressure or a low-pressure fluid line. This second fluid port is joined to the second chamber 22 through a second frustoconically-configured shoulder 28 which serves as a second sealing surface. A third fluid port 29 provides fluid communication through conduit 30 (e.g., lines 18 or 19 of FIG. 1) to a source of high-pressure helium. Chamber 21 is permanently sealed off at one end by a gas-tight transition joint 31 and controllably sealed off at the other end by a sealing ring 32 which terminates outer valve stem 33 within valve block 20 and makes line sealing contact with sealing surface 23. In like manner, chamber 22 is controllably sealed off by sealing ring 32 and a second sealing ring 34 terminating the inner valve stem 35 and making sealing contact with surface 28.

Axial motion is imparted to the valve stems by screw drive mechanisms located within drive housing 40 which defines a fluid-tight volume, generally designated at 38, which is in fluid communication with first chamber 21 of valve body 20 (as described below) so that no gas forces must be overcome in actuating the valve stems. Outer stem 33 is moved through a gear drive system 43 which in turn is driven through a drive shaft 44 extending externally of drive housing 40; and inner stem 35 is moved through a drive shaft 45, also extending externally of drive housing 40, and a screw drive assembly generally indicated at 42. A sleeve 46, attached to the housing, fits around the valve stems and serves as a means to which is sealed a thin walled tubing 48 encasing the valve stems through a gas-tight transition joint 47. Also sealed to sleeve 46 is a vacuum jacket 49 shown in diagrammatic fashion as enclosing the major part of the length of the valve stems as well as valve block 20. In actual construction, vacuum jacket 49 will be integrated into the evacuated insulation system of the apparatus into which it is incorporated. Such an insulation system will, of course, include appropriate insulation for the conduits 25, 27 and 30. Therefore, the vacuum jacket 49, as shown, is highly diagrammatic and is drawn in to indicate the fact that the greater portion of the valve stems and all of the valve block with it connections are suitably insulated with means well-known in the cryogenic art.

The valve block as well as the stem driving means, is shown in detail in FIGS. 3–9. FIGS. 3–7 detail the constructions of the valve block and the valve stems and in these drawings, as well as in all of the other drawings, like reference numerals are used to refer to like elements of the apparatus.

The outer valve stem 33 is formed of an inner thin-walled tubing 55 and outer thin-walled tubing 56 which define between them an annular volume 57, preferably filled throughout most of its length with a light-weight, insulation 58, such as, for example, polyurethane foam, to reduce heat transfer by convection, along the length of the valve stem. The tubings are preferably formed of stainless steel or other metal having a low thermal conductivity at cryogenic temperatures. The thin-walled tubings 55 and 56 are sealed off within the valve block by a solid annular plug 59 which has a unique configuration as best shown in the enlarged details of FIGS. 4–6. This plug 59 is configured externally to define a shoulder 60 to seat tubing 56 and form a flush surface 61. Internally, plug 59 has a flange 62 directed radially inward to serve as a seat for tubing 55 and as a spacer stop for any radial motion of inner stem 35. Below flange 62, the plug has internal threads 63. As seen in the detailed drawing of FIG. 4 wherein the plug and sealing ring are shown separated, plug 59 terminates at this threaded end in seal-engaging surface 64 which has an annular groove 65 and an outwardly extending ridge 66 terminating in a circular line 67 for line sealing contact with seal 32. Seal 32 is formed of a commercially available elastomeric material suitable for cryogenic-temperature sealing (for example a synthetic fluorinated elastomer such as Kel-F$^R$ or a high-density, high-molecular weight polyethylene with a modulus of elasticity (at tension) of about 5,000 kp/cm$^2$) and is shaped (FIG. 4) as an annular member having a right-angled configuration and formed to have a horizontal ring section 70 and vertical edge section 71 defining at their external juncture an annular sealing line 72 adapted to form an essentially line sealing contact with sealing surface 23. Vertical edge section 71 is made to fit snuggly into groove 65 of plug 59 and is of such a height that the internal plug-contacting surface 73 of horizontal ring section 70 makes contact with seal-engaging surface 64 of plug 59. In assembly, plug ridge 66 is forced into ring section 70 to form an annular line seal between the circular line 67 of plug ridge 68 and the indentation thus formed in ring 70 (FIG. 5). Thus, through these line seals, the sealing member 32 remains effective even if the valve stems experience some minor misalignment and a line seal is provided on both sides of the volumes to be isolated, e.g., chambers 21 and 22 of FIG. 6.

The sealing member 32 is maintained in place on plug 59 by means of a seal retaining ring 80 which has external threads 81 to engage threads 63 of the plug, and a flange 82 extending radially outward to provide a seal-engaging surface 83 to force seal member 32 against seal engaging surface 64 of plug 59. Retaining ring 80 has an annular extension 84 which has two flats cut on the outside diameter to permit tightening with a wrench. Thus seal retaining ring serves the roles of washer and screw.

The inner valve stem is formed of a thin-walled tubing 90, likewise preferably formed of stainless steel, containing light-weight insulation 91 within the tube volume 92 and extending throughout the greater length of that volume. The inner valve stem terminates within valve block 20 in a plug 93 adapted to seal volume 92 and to provide means to hold sealing ring 34. Plug 93 has a central section 94 of larger diameter than either end, and the annular surface defined by section 94 provides a seal-engaging surface 95 which has an annular groove 96 and an outwardly extending annular ridge 97 terminating in a circular line 98 for line sealing contact with seal 34. Groove 96, ridge 97 and line 98 are identical in design and function to groove 65, ridge 66 and line 67 of FIG. 4. Seal 34 is configured in the same manner as seal 32 and serves the same purpose as that sealing member, namely to insure a continuous seal with plug 93 and controllable seal with shoulder 28. Sealing member 34 is maintained on plug 93 by means of screw 99, nut 100 and washer 101. Plug 93 has a passage 102 cut through it to allow a rod to be inserted during assembly to hold plug 93 while nut 100 is tightened.

Between the outer wall of inner stem tubing 90 and the inner wall of the inner tubing 55 of the outer valve stem there is defined an annular fluid passage 110 which is in continuous fluid communication with chamber 22 and hence with conduit 30 which leads to or comprises the high-pressure helium line. As will be seen in the enlarged details of FIGS. 5 and 6, flange 62 and seal retaining ring 80 are sized to give a clearance between their internal surfaces and the surface of tubing 90 to furnish a fluid passage 111 which provides for continued fluid communication between passage 110 and chamber 22. Thus passage 110 is continuously pressurized.

Figure 3:
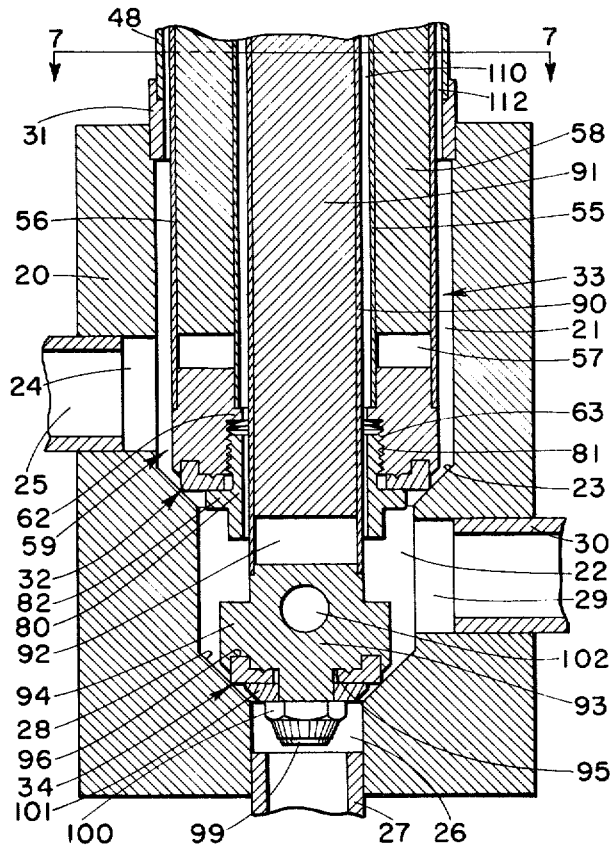
FIG. 3 is a cross section through the valve block.
Figure 7:
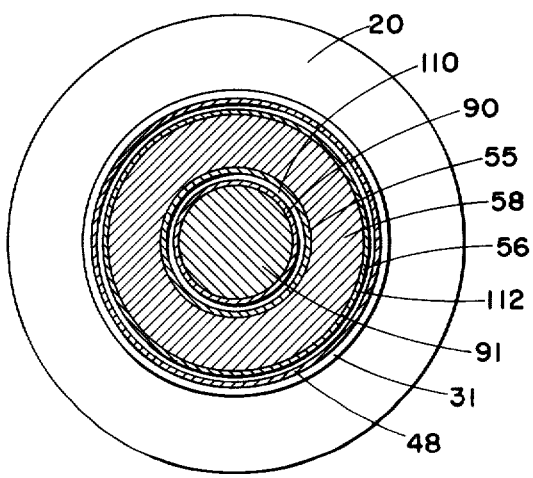
FIG. 7 is a cross section through the stems taken through plane 7—7 of FIG. 3.

As noted previously in connection with FIG. 2, a thin-walled tubing 48 (preferably formed of stainless steel) serves as a valve stem casing and extends from the valve block, to which it is sealed through gas-tight transition joint 31, to sleeve 46 to which it is likewise sealed through a gas-tight transition joint 47. The outer wall of outer tubing 56 defines an annular fluid passage 112 with the inner wall of this valve stem casing (FIGS. 3, 5, and 7). This fluid passage is open to chamber 21 and hence is in continued fluid communication with that chamber and is therefore maintained at the same pressure as that which prevails in chamber 21. This means that passage 112 is either pressurized or under vacuum. As will be seen below from the description of FIG. 8, passage 112 is also in fluid communication with volume 38 of drive housing 40 for the purpose to be later described.

Figures 4, 8:
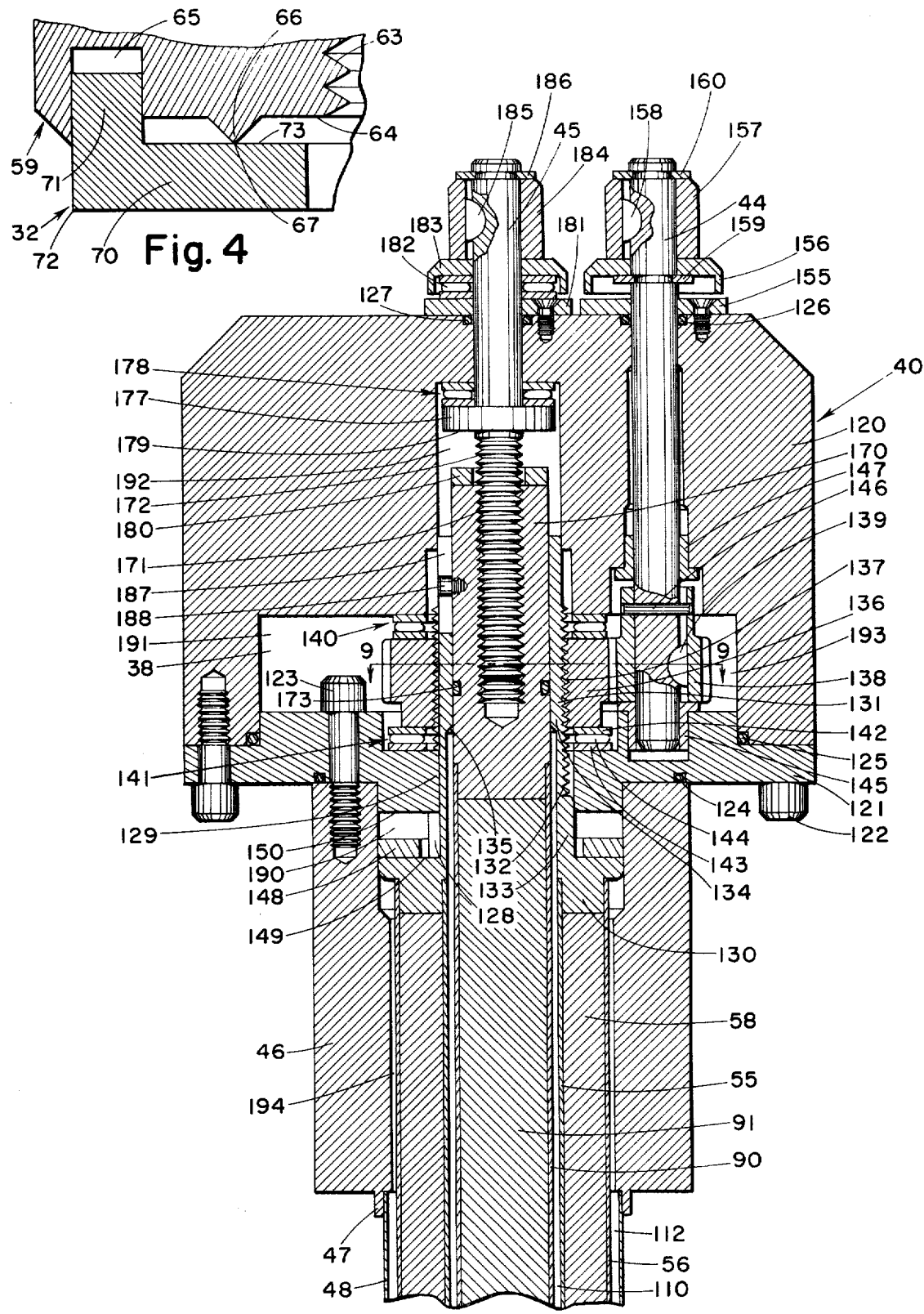
FIG. 4 is a much enlarged partial cross section of one of the sealing members and of the plug member on which it is mounted.
FIG. 8 is a cross section through the drive housing.
Figure 5:
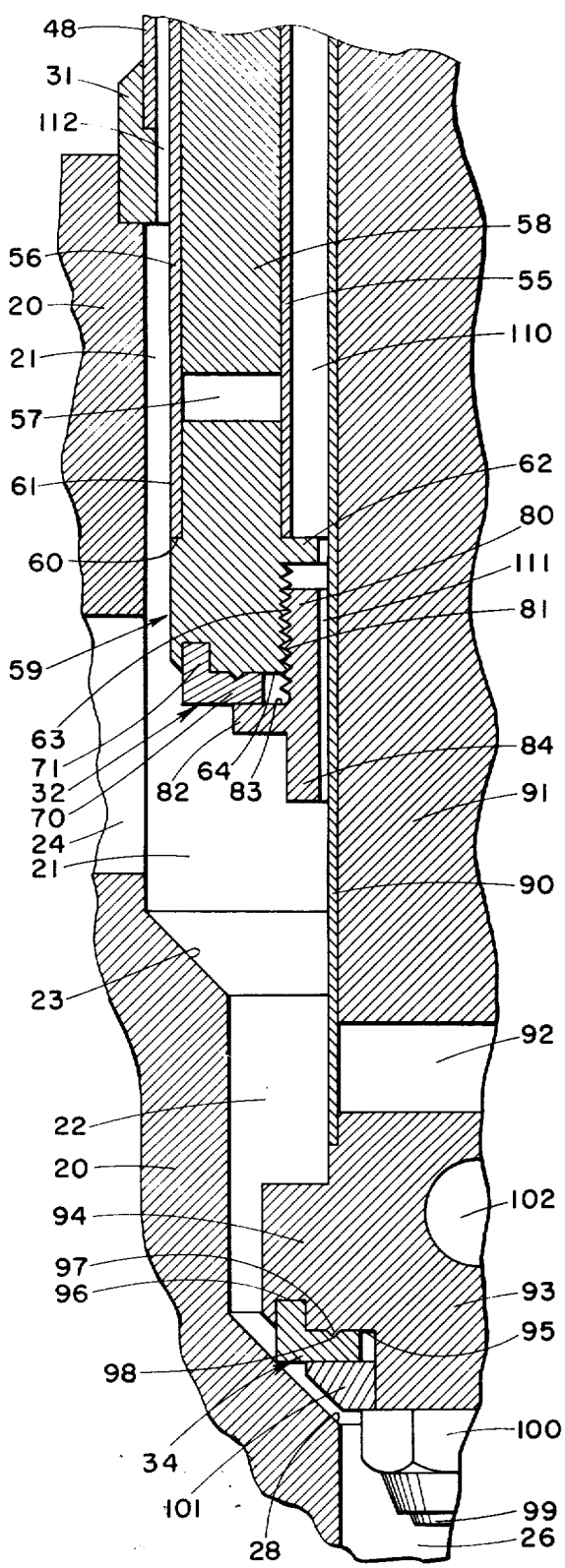
FIGS. 5 and 6 are enlarged cross sections through a portion of the valve block detailing the sealing means and fluid passages and illustrating the opening of the first and second ports, respectively.

FIG. 8 is a cross sectional detail drawing of the stem drive mechanism along with a portion of the tubings defining the inner and outer valve stems as well as the valve stem casing. FIG. 8 in combination with FIG. 3 provides a complete detailed cross section of the valve of this invention. Drive housing 40 in FIG. 8 is formed of a housing block member 120 and a plate member 121 affixed thereto through a plurality of screws 122. Sleeve 46 is fastened to housing plate member 121 through screws 123. Because volume 38 defined within the drive housing is fluid-tight, it is necessary to provide adequate sealing means between volume 38 and the atmosphere around the housing. This is done with sealing o-ring 124 between sleeve 46 and plate 121, sealing o-ring 125 between housing plate 121 and housing block 120, sealing o-ring 126 between block 120 and drive shaft 44 and sealing o-ring 127 between block 120 and drive shaft 45.

Tubings 55 and 56 forming the outer valve stem are terminated within sleeve 45 by means of plug extension 130 of the outer valve stem drive screw 131 which has external threads 132 and which is shaped as an annular ring having a larger internal diameter section 133 and a smaller internal diameter section 134 joined through a shoulder 135. A keyway 128 is cut axially in threads 132 and it is arranged to engage key 129 fixed to plate 121 so that the outer valve stem is prevented from rotating when gear 136 is turned. Axial motion is imparted to the outer valve stem by means of gear assembly 43 which includes a gear 136 having internal threads 137 adapted to engage threads 132 of drive screw 131 (see FIG. 9). Gear 136 is in turn driven by gear 138 affixed through key 139 to outer valve stem drive shaft 44 which extends externally of the drive housing, and is sealed by o-ring 126. Associated with gear 136 are thrust bearings 140 and 141, each formed of an upper race 142, lower race 143 and a plurality of thrust rolls 144. The purpose of these bearings is to minimize friction resulting from the thrust load on gear 136. The internal surface of housing plate member 121 is cut to seat thrust bearing 141 as well as bushing 145 associated with gear 138 and drive shaft 44 to which gear 138 is affixed through pin 146. Likewise housing block 120 is internally configured to seat bushing 147 serving to align drive shaft 44.

A spacer 148 is located on a shoulder 149 which joins plug extension 130 with section 133 of drive screw 131. That portion 150 of the surface of plate member 121 which extends into sleeve 46 serves as a travel stop for the motion of the outer valve stem by engagement with the free surface of spacer 148. Thus by choosing the thickness of spacer 148 it is possible to set the distance through which the outer valve stem, and hence the outer valve, may be moved.

Associated with outer valve stem drive shaft 44 and external of drive housing block 120 there are an o-ring retainer member 155, a dummy bearing housing 156, nut 157 affixed to screw shaft 44 through a key 158, and retaining rings 159 and 160. Nut 157, through which the outer valve stem is moved, is thus fixed but free to rotate to effect the required motion of the outer valve stem.

Tubing 90, forming the inner valve stem, is terminated within drive housing 40 by means of a solid inner stem member 170 which has internal threads 171 and which serves also as an end plug for volume 92. Axial movement of the inner valve stem is achieved by rotating drive shaft 45 which has threads 172 adapted to engage internal threads 171 of stem member 170 which is sized to move within annular screw drive 131. A sealing o-ring 173 is provided between stem member 170 and screw drive 131 to seal off annular passage 110, which terminates at shoulder 135, from fluid-tight volume 38 defined within the drive housing. A travel stop 177 is affixed to drive shaft 45 and serves in the dual role of a retaining ring to seat thrust bearing 178 (formed in the same manner as thrust bearings 140 and 141) and to provide an engaging surface 179 for spacer 180 which is affixed to the exposed surface of stem member 170. The thickness of spacer 180, like that of spacer 148, may be chosen to adjust the length of travel of the inner valve stem. Inner valve stem drive shaft 45, as noted above, is sealed with o-ring 127 which in held by retaining ring 181. A second thrust bearing 182, positioned between retaining ring 181 and bearing housing 183, is provided externally of the drive housing. Nut 184 is affixed through key 185 to drive shaft 45 and held by retaining ring 186 so that it is fixed but free to rotate to impart axial motion to the inner valve stem. A slot 187 is cut axially in the top end of screw 131 and a small socket head cap screw 188 is threaded into inner stem member 170 so that the head of screw 188 runs in the slot to prevent the inner valve stem from rotating when screw drive 45 is turned.

The operation of the three-way cryogenic valve of this invention may be described with reference to FIGS. 3, 5, 6 and 8 and with particular reference to a helium clean-up system such as is diagrammed in FIG. 1. In FIG. 3, both ports 24 and 26 are closed off since both of the valve stems are in a position to force sealing members 32 and 34 in sealing contact with sealing surfaces 23 and 28, respectively. Since port 29 always remains open it is connected to the high-pressure helium flow path, e.g., line 18 of FIG. 1. Assume that charcoal trap 12 is to be used first to adsorb impurities from the high-pressure helium stream. This means that port 24 (equivalent to port $a$ of valves 10 and 11 of FIG. 1) must be opened. To do this, drive shaft 44 is turned to move the outer valve stem 33 through gears 136 and 138 and to bring the outer valve stem assembly including seal 32 into the position illustrated in FIG. 5. The high-pressure helium can then flow from the second chamber 22 in the valve block to the first chamber 21 and thus out through conduit 25 (equivalent to line 16 of FIG. 1). However, seal 34 remains in contact with sealing surface 28 to seal off port 26 and to allow conduit 27 and the volume of port 26 up to seal 34 to be evacuated. Thus for example, one may have a vacuum of 500 micron in conduit 27 and a pressure of 250 p.s.i. in chambers 21 and 22 while at the same time maintaining a fluid temperature within the cryogenic range, e.g., about 10°K.

From FIGS. 3, 5 and 8, it will be seen that so long as outer valve stem 33 is in the position shown in FIG. 5, passage 112 which remains in fluid communication with first chamber 21 is also in fluid communication with the high-pressure helium stream. Thus the fluid-tight volume comprising chambers 190–193, joined through passage 194 to passage 112, is pressurized with high-pressure helium to maintain a pressure equilibrum across the screw drive mechanism. As noted previously, fluid passage 110 remains pressurized since it remains in continued fluid communication with port 29.

Figure 6:
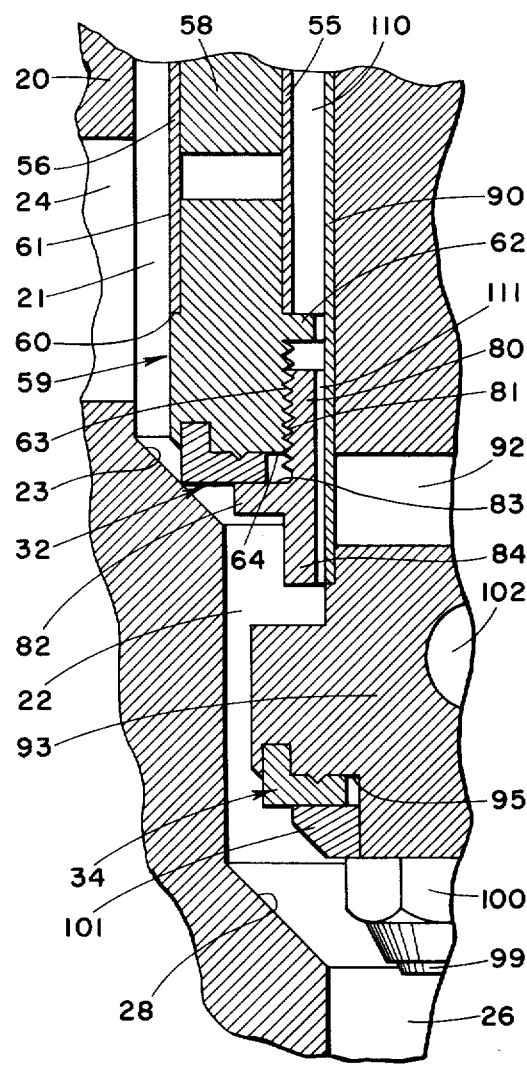

When the flow of high-pressure helium through line 16 and charcoal trap 12 is to be cut off, the outer valve stem drive shaft 44 is turned to bring seal 32 in sealing contact with sealing surface 23 and the inner valve stem drive shaft 45 is turned to move the inner valve stem assembly including seal 34 into the position shown in FIG. 6. As explained previously in connection with FIG. 1, this reverses the previous situation. Port 26 is opened, allowing high-pressure helium to flow into conduit 27 (e.g., through path 17 of FIG. 1) while charcoal trap 12 and line 16 are evacuated to remove adsorbed impurities from charcoal trap 12. Now seal 32 must be capable of isolating the high-pressure chamber 22 from evacuated chamber 21. Simultaneously with the evacuation of chamber 21 the evacuation of the fluid-tight volume (chambers 90–93) of the drive housing is effected, again eliminating any pressure differential across the screw drive mechanism.

Thus the three-way valve of this invention makes it possible to cycle fluids between zones of great pressure differences, and to perform the function of what had heretofore required two separate valves. By minimizing the number of valve stems and by providing for their insulation the heat leak into any cryogenic system into which the valves are incorporated may be minimized. Finally, by controlling the fluid pressure within the housing in which the screw drive mechanisms are located, gas force friction is eliminated.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. A three-way fluid-flow control valve adapted to provide controllable fluid communication between zones of different fluid pressures, comprising in combination a. a valve body having defined therein a first chamber and a second chamber, said first chamber having a diameter larger than that of said second chamber and being joined thereto by a frustoconically-configured shoulder defining a first sealing surface;

b. a first fluid port opening into said first chamber of said valve body;

c. a second fluid port communicating with said second chamber of said valve body through a frustoconically-configured shoulder defining a second sealing surface;

d. a third fluid port opening into said second chamber of said valve body;

e. outer valve stem means terminating within said valve body in a first sealing member configured to make an essentially line sealing contact with said first sealing surface thereby to controllably isolate said first chamber from said second chamber;

f. inner valve stem means extending through and coaxial with said outer valve steam means and defining therewith an annular fluid passage continuously in fluid communication with said third fluid port, said inner valve stem means terminating within said valve body in a second sealing member configured to make an essentially line sealing contact with said second sealing surface thereby to controllably isolate said second chamber from said second fluid port;

g. first drive means including first screw means adapted to impart axial motion to said outer valve stem means;

h. second drive means including second screw means adapted to impart axial motion to said inner valve stem means independent of said first drive means;

i. housing means defining fluid-tight screw chamber means around said first and second screw means; and j. fluid passage means providing fluid communication between said first chamber in said valve body and said screw chamber means.

2. A valve in accordance with claim 1 wherein said first and second sealing members each comprise an elastomeric annular member having a right-angled configuration formed to have a horizontal ring section and a vertical edge section defining at their external juncture an annular sealing line adapted to make said essentially line sealing contact.

3. A valve in accordance with claim 2 wherein said outer valve stem means comprises concentric thin-walled tubings defining an annular volume therebetween, one end plug means sealing off said annular volume at the end of said outer valve stem means terminating within said valve body, and other end plug means sealing off the other end of said annular volume, said one end plug means having a first sealing member-engaging surface external of said annular volume.

4. A valve in accordance with claim 3 wherein said first sealing member-engaging surface of said one plug means has an annular peripheral groove sized to contain said vertical edge section of said first sealing member and a ridge terminating in an annular sealing line and said first sealing member has an annular groove formed into said horizontal ring section when said first sealing member is engaged under pressure with said ridge of said first sealing-member engaging surface, thereby forming a line seal between said first sealing member and said first seal-member engaging surface.

5. A valve in accordance with claim 3 wherein said first drive means includes gear means adapted to engage said first screw means and rotatable drive shaft means extending external of said housing means whereby rotation of said drive shaft means imparts said axial motion to said outer valve stem means.

6. A valve in accordance with claim 5 including thrust bearings associated with said gear means.

7. A valve in accordance with claim 5 wherein said other end plug means ia a continuation of said first screw means thereby providing a direct connection between said first drive means and said outer valve stem means.

8. A valve in accordance with claim 7 including spacer means affixed to said other end plug means adapted to limit the extent of said axial motion of said outer valve stem means.

9. A valve in accordance with claim 3 including thermal insulation in said annular volume defined within said outer valve stem means.

10. A valve in accordance with claim 2 wherein said inner valve stem means comprises a thin-walled tubing and one end plug means sealing off the volume within said tubing at the end of said inner valve stem means terminating within said valve body and other end plug means sealing off the other end of said volume, said one end plug means defining a second sealing member-engaging surface external of said volume.

11. A valve in accordance with claim 10 wherein said second sealing member-engaging surface of said one plug means has an annular peripheral groove sized to contain said vertical edge section of said second sealing member and a ridge terminating in an annular sealing line and said second sealing member has an annular groove formed into said horizontal ring section when said second sealing member is engaged under pressure with said ridge of said sealing member engaging surface, thereby forming a line seal between said second sealing member and said second seal member engaging surface.

12. A valve in accordance with claim 10 wherein said second screw means of said second drive means is rotatable within said first screw means and includes rotatable drive shaft means extending external of said housing means whereby rotation of said drive shaft means imparts said axial motion to said inner valve stem means and wherein said valve includes means to effect a fluid seal between said first and second screw means.

13. A valve in accordance with claim 12 including thrust bearing means associated with said rotatable drive shaft means.

14. A valve in accordance with claim 10 wherein said second screw means serves as said other end plug means whereby said inner valve stem means is connected directly to said second screw means.

15. A valve in accordance with claim 14 including spacer means affixed to said second screw means adapted to limit the extent of said axial motion of said inner valve stem means.

16. A valve in accordance with claim 10 including thermal insulation in said volume within said tubing forming said inner valve stem means.

17. A valve in accordance with claim 1 including sleeve means affixed to said housing means and valve stem encasing means extending between said sleeve means and said valve body, said sleeve means and said encasing means defining with said outer valve stem means an annular fluid passage which serves as said fluid passage means providing fluid communication between said first chamber in said valve body and said screw chamber means.

* * * * *